(12) United States Patent
Ramos

(10) Patent No.: US 8,424,883 B1
(45) Date of Patent: Apr. 23, 2013

(54) UTILITY CART

(76) Inventor: Richard Ramos, Kihei, HI (US)

( * ) Notice: Subject to any disclaimer, the term of this patent is extended or adjusted under 35 U.S.C. 154(b) by 227 days.

(21) Appl. No.: 13/007,633

(22) Filed: Jan. 16, 2011

(51) Int. Cl.
*B62B 3/02* (2006.01)
(52) U.S. Cl.
USPC .......................... 280/35; 280/47.35; 108/145
(58) Field of Classification Search .................. 280/638, 280/35, 639, 43.17, 43.2, 47.34, 47.35; 108/144.11, 108/145, 147.11, 147.19
See application file for complete search history.

(56) References Cited

U.S. PATENT DOCUMENTS

| | | | | |
|---|---|---|---|---|
| 2,645,538 A | * | 7/1953 | Segal | 108/145 |
| 2,805,905 A | * | 9/1957 | Levitan et al. | 108/145 |
| 4,655,466 A | * | 4/1987 | Hanaoka | 280/47.371 |
| 5,002,293 A | * | 3/1991 | Gottselig | 280/47.35 |
| 7,249,771 B1 | * | 7/2007 | Brennan et al. | 280/35 |
| 2002/0030337 A1 | * | 3/2002 | Calmeise et al. | 280/47.35 |
| 2007/0034125 A1 | * | 2/2007 | Lo | 108/145 |

* cited by examiner

*Primary Examiner* — John Walters
(74) *Attorney, Agent, or Firm* — Gulf Coast Intellectual Property Group

(57) ABSTRACT

A utility cart operable to provide objects thereon to a user that is in a position that is generally above the cart such that a portion of the cart to extended to be proximate the user. The cart further includes a frame that includes a base member having four legs that support a platform. The platform includes several recessed compartments that house lifting members. The lifting members are operably coupled to an upper tray. The platform further has disposed therein a plurality of gears that are operably coupled to drive rods, which operate the lifting members. A handle acts as the controller wherein the user can provide rotational force to the handle, which is transferred to the gears and subsequently the drive rods creating the movement in the lifting members which transitions the position of the upper tray.

9 Claims, 3 Drawing Sheets

UTILITY CART

FIELD OF THE INVENTION

The present invention relates to a utility cart, more specifically but not by way of limitation a utility cart having a first portion and a second portion wherein the first portion is operable to extend to a height greater than the second portion so as to provide tools to a user positioned at a level higher than the second portion.

BACKGROUND

Homeowners and individuals that engage in the maintenance of their properties often perform a variety of tasks such as painting, plumbing or electrical repair. During the performance of these tasks the individual will utilize a variety of specialized implements in order to accomplish the task efficiently and correctly. For example but not by way of limitation, when an individual desires to apply a coating to a portion of a structure such as a wall, the individual will typically utilize at least one or two types of applicator brushes and a coating material such as paint that is usually stored in a can. Many portions of the wall can be significantly higher than the floor and can be difficult to reach without the assistance of a device such as scaffolding or a ladder. The aforementioned devices are often utilized to assist a user reach an area than is at a height greater than the reach of the individual.

One problem with devices such as ladders is that they have a limited ability to hold a variety of implements that an individual may need to perform a task. When applying a coating, individuals may need to utilize implements such as but not limited to tape, taping knives, sandpaper, paint brushes, and/or coating material. Conventional ladders provide a very small support member that is not capable of storing and providing access to the aforementioned implements. This results in the individual routinely returning to the floor to retrieve one of the aforementioned implements, which can greatly increase the time required to perform a desired task. Additionally, the traversing excessively up and down a ladder can put a user at risk for injury.

Another device conventionally utilized to perform tasks at a level higher than the ground is scaffolding. Scaffolding is typically installed utilizing side support members with a horizontal support member intermediate the side support members. The horizontal support member is typically a twelve-inch wide wood or metal plank. The plank provides a place for the user to stand and reach a higher level and can accommodate at least one implement. One problem with conventional scaffolding is that the plank is narrow and typically does not have the capacity to hold the user and a variety of implements potentially required to perform a task. Additionally, the user is required to place the implements on the plank on which they are standing. This can create significant hazards as the user attempts to traverse the plank with the implements superposed thereon and additionally requires the user to perform maneuvers such as frequently bending down so as to reach a desired implement.

Accordingly, there is a need for a device that can be configured to accommodate a plurality of implements routinely required for maintenance tasks wherein the device has a base member and a support member configured to extend to a height at least greater than the base member so as to provide a plurality of implements proximate to the user that is positioned above the floor.

SUMMARY OF THE INVENTION

It is the object of the present invention to provide a utility cart that includes an upper portion that is operable to extend in a generally vertical direction.

Another object of the present invention is to provide a utility cart that has an extendable upper portion wherein the upper portion is adaptable to store a plurality of different implements and maintenance supplies.

A further object of the present invention is to provide a utility cart that further includes a lifting member operably coupled to the extendable upper portion.

An additional object of the present invention is to provide a utility cart that includes an upper portion that is operable to extend in a generally vertical direction wherein the lifting member can be operated manually or automatically.

Still another object of the present invention is to provide a utility cart that includes an extendable upper portion that is mounted on wheels for easier maneuverability.

Yet a further object of the present invention is to provide a utility cart that includes an extendable upper portion wherein the upper portion is interchangeable.

To the accomplishment of the above and related objects the present invention may be embodied in the form illustrated in the accompanying drawings. Attention is called to the fact that the drawings are illustrative only. Variations are contemplated as being a part of the present invention, limited only by the scope of the claims.

BRIEF DESCRIPTION OF THE DRAWINGS

A more complete understanding of the present invention may be had by reference to the following Detailed Description and appended claims when taken in conjunction with the accompanying Drawings wherein:

DETAILED DESCRIPTION

Figure 1:
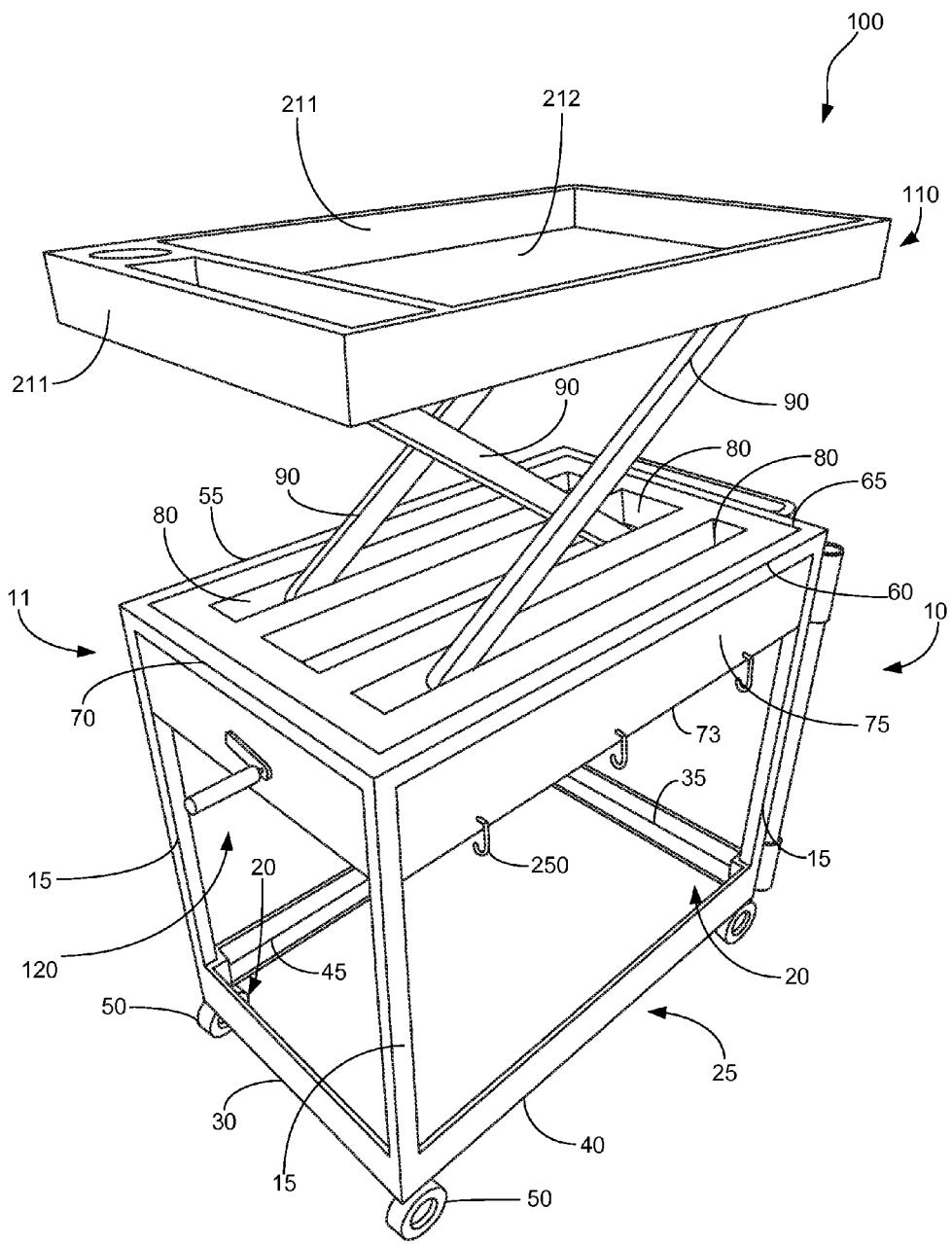
FIG. 1 is a perspective view of the preferred embodiment of the present invention with the upper portion in an extended position.

Referring now to the drawings submitted herewith, wherein various elements depicted therein are not necessarily drawn to scale and wherein through the views and figures like elements are referenced with identical reference numerals, there is illustrated a utility cart 100 constructed according to the principles of the present invention.

Referring in particular to FIG. 1 is a utility cart 100 that further includes a frame 10 manufactured from a suitable durable rigid material. The frame 10 includes four legs 15 oriented in a generally vertical manner. Each of the four legs 15 are positioned at the corners 20 of the base member 25. The base member 25 further includes first and second lateral support members 30,35 integrally formed with first and second longitudinal support member 40, 45. The base member 25 is generally rectangular in shape and functions to provide structural rigidity and support for the utility cart 100. While the base member 25 is illustrated herein as being rectangular in shape, it is contemplated within the scope of the present invention that the base member 25 could be formed in numerous different shapes. Additionally, while the base member 25 in the preferred embodiment illustrated herein utilizes first and second longitudinal support members 40, 45 and first and second lateral support members 30,35, it is contemplated within the scope of the present invention that the base member 25 could utilize different quantities of lateral support members 30,35 and/or longitudinal support members 40,45 in order to create a frame 10 having a different shape. The frame 10 is superposed on wheels 50 so as to facilitate the movement of the utility cart 100. The wheels 50 are secured to the base member 25 proximate each corner 20 utilizing suitable mechanical fastening methods and are manufactured from conventional caster type wheels that provide swivel functionality in order to assist in the easier movement of the utility cart 100. While in the illustration submitted herewith there is no member intermediate the first and second lateral support members 30,35 and the first and second longitudinal support members 40,45 it is contemplated that a floor member could be secured intermediate thereto so as to provide a support structure for objects.

The frame 10 further includes an upper first and second longitudinal support member 55,60 and an upper first and second lateral support member 65,70. Integrally formed with the upper first and second longitudinal support members 55,60 and the upper first and second lateral support members 65,70 is the platform 75. The platform 75 is manufactured from a suitable durable rigid material and is secured to the upper portion 11 of the frame 10 utilizing suitable durable methods. The platform 75 includes three recessed compartments 80 functioning to house the lifting rams 90. The three recessed compartments 80 are generally rectangular in shape having an interior volume suitable to store the lifting rams 90 when the upper tray 110 is in a generally retracted position. While three recessed compartments 80 are illustrated in the drawings submitted herewith, it is contemplated within the scope of the present invention that the utility cart 100 could have any number of recessed compartments 80 configured to receive the lifting rams 90. Additionally, while the three recessed compartments 80 are illustrated herein as being rectangular in shape, it should be noted by those skilled in the art that the three recessed compartments 80 could be formed in numerous different shapes so as to accommodate different styles of lifting rams 90.

Figure 3:
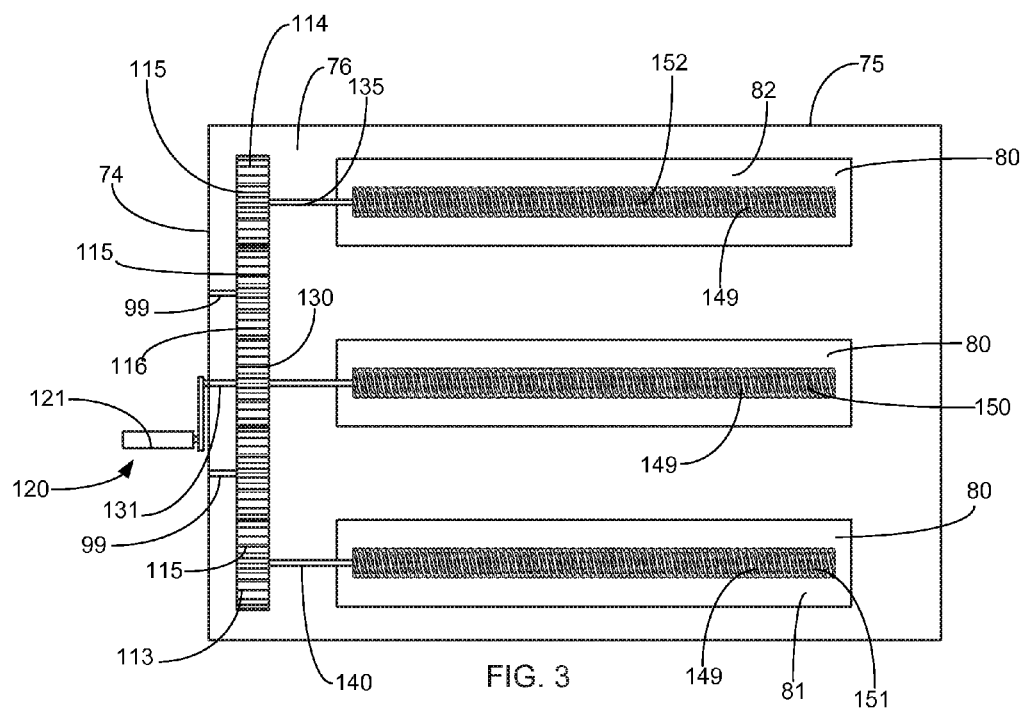
FIG. 3 is a diagrammatic view of the lifting member of the present invention.
Figure 5:
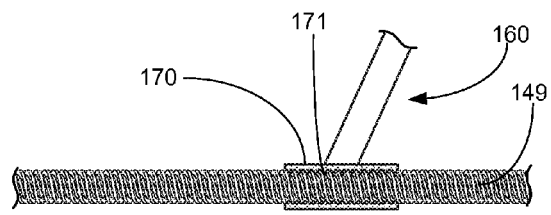
FIG. 5 is a detailed view of the drive rod of the present invention.

Referring in particular to FIG. 3 a diagrammatic view of the platform 75 is illustrated therein. The platform 75 further includes a generally hollow interior 76 so as to accommodate a plurality of gears 115. The gears 115 are traditional pinion type gears having a plurality of interconnecting teeth 116 operably engaged with the teeth 116 of the adjacent gear 115. The gears 115 are rotatably mounted to the wall 74 of the platform 75 utilizing rods 99. The rods 99 are generally cylindrical in shape and function to permit the gears 115 to be rotated in either a clockwise or counter-clockwise direction. Those skilled in the art should recognize that the gears 115 could be rotatably mounted to the wall 74 utilizing numerous suitable fasteners. A handle 120 is operably coupled to the primary gear 130. The handle 120 includes a grip 121 and a shaft 131 that is journaled through the wall 74 and operably coupled to the primary gear 130. As the handle 120 is rotated by the user, the shaft 131 functions to rotate the primary gear 130 in the same direction as the shaft 130 is being rotated. The shaft 131 is additionally operably engaged with the first drive rod 150. The first drive rod 150 functions to rotate and move the end 160 of the lifting ram 90 having the coupling 170 engaged therewith so as to traverse the coupling 170 along the first drive rod 150. A coupling 170 is operably mounted to each lifting ram 90 proximate ends 160 as illustrated in particular in FIG. 5. The first drive rod 150 is a conventional spirally threaded rod that is operably engaged with the coupling 170. The coupling 170 includes mateable threads 171 that facilitate the traversal of the coupling 170 over the first drive rod 150 as the first drive rod 150 is rotated in either a clockwise or counter-clockwise direction. As the first drive rod 150 is rotated the coupling 170 traverses along the first drive rod 150 thereby changing the orientation of the lifting ram 90 such that the upper tray 110 is either extended away from the platform 75 or retracted towards the platform 75.

The platform 75 further includes a second drive rod 151 and a third drive rod 152 housed in the second recessed compartment 81 and third recessed compartment 82 respectively. The second drive rod 151 is operably connected with gear 113 utilizing the shaft 140. As the primary gear 116 is rotated, the gears 115 rotatably coupled to the gear 113 function to provide rotational force to the gear 113. As gear 113 rotates, the shaft 140 operably coupled thereto functions to spin the second drive rod 151 in the same rotational direction. As previously discussed herein, the rotational movement of the second drive rod 151 causes the coupling 170 to traverse along the second drive rod 151 so as to assist in the generally upward or downward vertical movement of the upper tray 110.

The third drive rod 152 is operably connected with gear 114 utilizing the shaft 135. As the primary gear 130 is rotated, the gears 115 rotatably coupled to the gear 114 function to provide rotational force to the gear 114. As gear 114 rotates, the shaft 135 operably coupled thereto functions to spin the third drive rod 152 in the same rotational direction. As previously discussed herein, the rotational movement of the third drive rod 152 causes the coupling 170 to traverse along the third drive rod 152 so as to assist in the generally upward or downward vertical movement of the upper tray 110.

Figure 4:
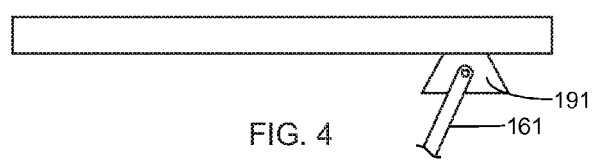
FIG. 4 is a detailed view of the hinge member of the upper portion.

As shown in particular in FIG. 4, the ends 161 of the lifting rams 90 are pivotally connected to the upper tray 110 utilizing conventional pivot hinges 191 that allow for the proper movement required as the lifting rams 90 traverse along the drive rods 149. Those skilled in the art will recognize that the lifting rams 90 could be pivotally coupled to the upper tray 110 utilizing numerous suitable fasteners. While in the preferred embodiment illustrated herein the utility cart 100 includes three lifting rams 90 operable to move the upper tray 110 it is contemplated that the utility cart 90 could utilize any number of lifting rams 90 to move the upper tray 90. Additionally, it is contemplated within the scope of the present invention that alternative methods of extending and retracting the upper tray 110 could be utilized. More specifically but not by way of limitation, the platform 75 could have recessed therein at least one hydraulic cylinder configured to be operated manually or with motorized assistance so as to move the upper tray 110 in a generally vertical direction. Furthermore, while a handle 120 has been illustrated herein being operably connected to the gears 115, it is contemplated that an electric motor could be utilized in place of and/or in conjunction with the handle 120 so as to extend or retract the upper tray 110.

The upper tray 110 includes a plurality of walls 211 and a bottom 212 forming an interior volume 213 so as to receive objects therein. The walls 211 extend generally perpendicular from the bottom 212 and are integrally formed therewith. The upper tray 110 further includes a first storage bin 215 and a second storage bin 220. The first storage bin 215 and second storage bin 220 are configured to be of smaller size than the interior volume 213 so as to be adaptable to retain particular implements for a given task such as but not limited to painting. For example but not by way of limitation, the second storage bin 220 is formed in a generally annular shape so as to securely receive a paint can or other similarly shaped object. It is contemplated within the scope of the present invention that the upper tray 110 could be configured with numerous different quantities and shapes of storage bins 225 so as to be adaptable to a variety of particular tasks required alternate implements. Additionally, it is further contemplated within the scope of the present invention that the upper tray 110 could be interchangeable with a plurality of alternative upper trays constructed to assist a user in performing a particular task. More specifically but not by way of limitation, alternative upper trays 110 could be configured to retain implements for tasks such as but not limited to plumbing, painting, drywall installation or electrical maintenance.

Figure 2:
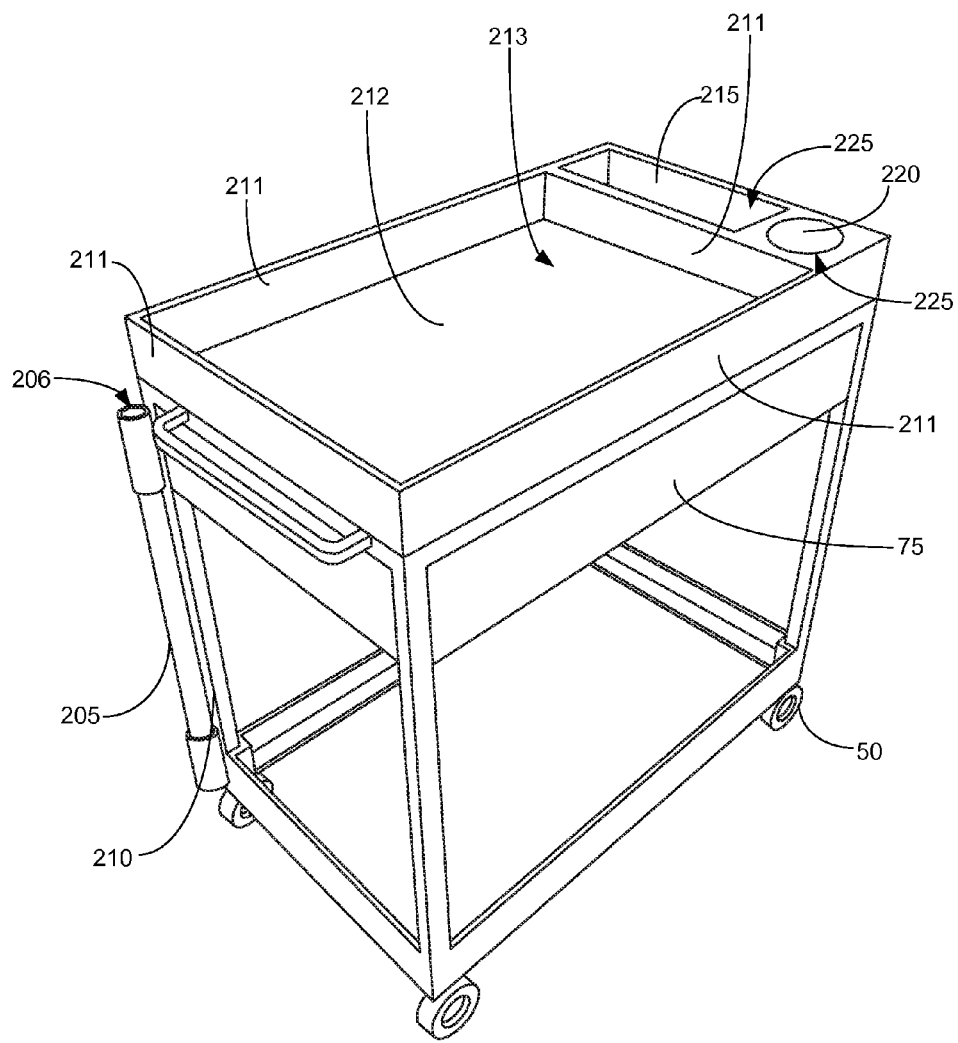
FIG. 2 is a perspective view of the preferred embodiment of the present invention with the upper portion in a retracted position.

Referring in particular to FIG. 2, a keeper 205 is illustrated therein. The keeper 205 is securely fastened to the leg 210 and is generally elongated and cylindrical in shape having an opening 206 so as to access the hollow interior volume. The keeper 205 is secured to the leg 210 utilizing suitable mechanical or chemical methods and is operable to retain items such as but not limited to paint roller brush extension handles. While one keeper is illustrated herein, it is contemplated within the scope of the present invention that the utility cart 100 could have as many as four keepers 205 secured thereto. As shown in particular in FIG. 1, the utility cart 100 further includes a plurality of hooks 250. The hooks 250 are conventional hooks manufactured from a suitable durable material such as but not limited to plastic or metal. The hooks 250 are secured to the bottom 73 of the platform 75 utilizing suitable mechanical or chemical methods and are operable to receive and store implements such as but not limited to paint brushes. While three hooks 250 are illustrated herein, it is contemplated within the scope of the present invention that the utility cart 100 could have secured thereto numerous quantities of hooks.

Referring in particular to FIGS. 1 and 3, a description of the operation of the utility cart 100 is as follows. In use, the utility cart 100 will have placed thereon various implements and supplies required to perform a task such as but not limited to painting. The user will place the utility cart 100 adjacent to the desired work area. When the user is required to access an area that is higher than the cart such that the user would be unable to reach any implements or tools stored in the upper tray 110, the user will engage the handle 120 and rotate so as to transition the upper tray 110 from a first retracted position to a second extended position. The user will rotate the handle 120 which drives the primary gear 116 and the connected gears 115 thereby providing rotational force to the shafts 130, 135 and 140 which in turn will spin the drive rods 149. As the drive rods 149 spin, the couplings 170 secured to the ends 160 of each lifting ram 90 will traverse along the drive rods 149 causing the lifting rams 90 to alter their angular position such that the upper tray 110 will be extended away from the platform 75. This will allow the user to access any items disposed on the upper tray when the user is in a position generally above the utility cart 100 such as superposed on a ladder. The upper tray 110 is returned to its first retracted position with the user rotating the handle 120 in the opposing direction.

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice the invention. It is to be understood that other suitable embodiments may be utilized and that logical changes may be made without departing from the spirit or scope of the invention. The description may omit certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A utility cart operable to provide objects to a user wherein the user is positioned in a place generally above at least a portion of the utility cart comprising:

a frame, said frame having a base, said base being generally rectangular in shape, said frame further including a plurality of leg members, said leg members integrally formed with said base, said leg members being substantially vertical in manner;

a first tray, said first tray being generally rectangular in shape, said first tray being seduced to said frame opposite said base, said first tray further including a plurality of compartments, said plurality of compartments having an opening, said plurality of compartments including an interior volume;

a second tray, said second tray generally superposed said first tray, said second tray movably connected to said first tray, said second tray having a first position and a second position, said second tray operable to extend in a generally vertical manner in relation to said first tray;

a plurality of lifting members, said plurality of lifting members operably connecting said first tray and said second tray, said plurality of lifting members having a first end and a second end, said plurality of lifting members operable to move said second tray in a generally vertical direction, wherein said first end of said plurality of lifting members movably mounted within said plurality of compartments;

a handle, said handle having a portion that is journaled into said first tray, said handle further including a portion that is external to said first tray, said handle being operably connected to said lifting members, said handle operable to move said lifting members between said first position and said second position; and a plurality of drive rods, said drive rods operably connected to said first end of said plurality of lifting members, said drive rods operable to laterally move said first end of said plurality of lifting members within said plurality of compartments.

2. The utility cart as recited in claim 1, wherein said second tray further includes a plurality of storage compartment, said plurality of storage compartments having a different shape so as to mateably receive a particular object.

3. The utility cart as recited in claim 2, wherein said second tray is releasably secured to said second ends of said plurality of lifting members so as to be interchangeable.

4. A utility cart operable to provide a tool or a supply to a user that is located in a position that is generally above the utility cart comprising:

a frame, said frame further including a base member, said base member having four corners and being generally rectangular in shape, said frame further including four leg members, said four leg members integrally secured to said base member, said four leg members extending in a vertical manner upwards from said four leg members;

a first portion, said first being integrally secured to said four leg members distal to said base member, said first portion being generally rectangular in shape, said first portion having a bottom surface and a top surface, said first portion further including three recessed compartments, said three recessed compartments being formed into said first portion, said three recessed compartments having an opening, said three recessed compartments having an internal volume;

a second portion, said second portion being superposed said first portion, said second portion being generally rectangular in shape, said second portion having a bottom and four sides forming an interior volume, said second portion movably connected to said first portion, said second portion having a first position and a second position, said second portion being adjacent to said first portion in said first position;

three lifting members, said lifting members being generally cylindrical in shape, said three lifting members having a first end and a second end, said first end being movably mounted within said three recessed storage compartments, said second end being hingedly connected to said bottom of said second portion, wherein said second portion in said second position is operable to provide objects placed thereon to a user located in a position that is above the utility cart.

5. The utility cart as recited in claim 4, and further including three drive rods, said three drive rods rotatably mounted with said interior volume of said three recessed compartments, said drive rods being cylindrical in shape having a threaded exterior surface, said three drive rods operably engaged with said first ends of said three lifting members.

6. The utility cart as recited in claim 5, and further including a plurality of gears, said plurality of gears disposed within said first portion, said plurality of gears rotatably mounted to said first portion, said plurality of gears operably connected to said three drive rods, said plurality of gears functioning to provide rotational force to said three drive rods.

7. The utility cart as recited in claim 6, wherein said first ends of said three lifting members further include a coupling, said coupling configured to engage said threaded exterior surface of said three drive rods, said coupling operable to traverse said three drive rods subsequent said three drive rods having a rotational force applied thereto.

8. The utility cart as recited in claim 7, wherein said second portion further includes a plurality of compartments, said plurality of compartments being configured in different shapes.

9. The utility cart as recited in claim 8, and further including a handle, said handle being rotatably mounted to said first portion, said handle having a first section and a second section, said first section being external to said first portion, said second section being disposed within said first portion, said second section operably coupled to at least one of said plurality of gears, said handle operable to provide rotational force to said plurality of gears.

* * * * *